Patented Apr. 22, 1952

2,593,853

UNITED STATES PATENT OFFICE 2,593,853

$\Delta^3$-PYRROLINYL COMPOUNDS AND DERIVATIVES THEREOF

John William Copenhaver, Short Hills, N. J., assignor to General Aniline & Film Corporation, New York, N. Y., a corporation of Delaware No Drawing. Application October 18, 1949, Serial No. 122,140

12 Claims. (Cl. 260—313)

This invention relates to N-aliphatic substitution products of $\Delta^3$-pyrroline and a process for their preparation, as well as to a process for preparing oxidation products of said compounds.

It is an object of this invention to provide N-aliphatic $\Delta^3$-pyrroline derivatives wherein the nitrogen atom of the $\Delta^3$-pyrroline radical is attached to a carbon atom, of which at least one of the remaining valences is joined to carbon and the other remaining valences are joined to hydrogen.

It is also an object of this invention to provide a process for preparing the aforesaid N-aliphatic $\Delta^3$-pyrrolines, as well as oxidation products thereof wherein the $\Delta^3$-pyrrolinyl rings are converted to iminodiacetic acid radicals.

In accordance with my invention, the aforesaid N-aliphatic derivatives of $\Delta^3$-pyrroline are prepared by condensing $\Delta^3$-pyrroline in aqueous solution and in the presence of an acid binding agent with an aliphatic halogen compound in which one of the valences of at least one carbon atom is attached to a replaceable halogen atom, at least one of the remaining valences of said carbon atom being joined to another carbon atom and the other remaining valences being joined to hydrogen. The condensation is effected by heating the aforesaid reagents to be condensed, preferably in stoichiometric proportions, in water containing an acid binding agent such as an alkali or alkaline earth metal oxide, hydroxide or carbonate, which is preferably employed in sufficient amount to combine with all of the hydrogen halide liberated in the condensation reaction. Suitable temperatures for carrying out the aforesaid condensation generally range from 70 to 100° C., the condensation being advantageously effected in a reflux apparatus. The resulting condensation products are compounds in which the halogen of the aliphatic intermediates are replaced by N-$\Delta^3$-pyrrolinyl radicals.

Further, in accordance with my invention, the N-aliphatic derivatives of $\Delta^3$-pyrroline, produced in the process outlined above, are subjected to oxidation with a strong oxidizing agent such as permanganate, chromic acid, concentrated nitric acid, or by treatment with ozone and hydrogen peroxide, which attack the olefinic double bond of the $\Delta^3$-pyrroline radicals and oxidize these to imino-bis-acetic acid radicals. The resulting polycarboxylic acids can be converted, if desired, to corresponding salts, especially alkali metal or ammonium salts which are water-soluble. Many of the products thus obtained, especially in the form of their water-soluble salts, are available textile assistants for use in washing and dyeing processes, in that they inhibit or prevent precipitation of water-insoluble soaps from hard water.

The process of my invention is illustrated by the following examples, wherein parts and percentages are by weight unless otherwise indicated.

Examples 1, 2 and 3 illustrate condensation of $\Delta^3$-pyrroline with aliphatic halogen compounds, while the remaining examples illustrate oxidation of the products obtained according to Examples 1, 2 and 3.

Example 1

6.9 parts (0.1 mol) of $\Delta^3$-pyrroline (obtained, for example, by a process of the type described in U. S. P. 2,421,650 to Reppe et al., involving vapor phase condensation of butene-2-diol-1,4 with ammonia) are dissolved in 30 parts of water and 5.3 parts (0.05 mol) of sodium carbonate; 4.4 parts (0.05 mol) of ethylene dichloride are added to the resulting mixture. The reaction mixture is heated with vigorous agitation in a reflux apparatus at 80–100° C. for a period of 24 hours. After cooling, the resulting solution is extracted several times with diethyl ether, and the ether removed from the combined extracts by distillation. The residue is an aqueous concentrate containing principally 1,2-bis(N-$\Delta^3$-pyrrolinyl)-ethane. If desired, the combined ether extracts can be dried over anhydrous $K_2CO_3$, evaporated, and the residual product purified by fractional distillation under reduced pressure.

In similar manner, equivalent amounts of other alkylene dihalides can be employed instead of ethylene dichloride in the foregoing example. Thus, for example, there may be employed ethylene dibromide, propylene dichloride, 1,3-dichloropropane, 1,4-dichlorobutane, 1,2-dichloro-2-methyl propane, or 1,6-dichlorohexane, each of which can be condensed with $\Delta^3$-pyrroline to form the corresponding bis-$\Delta^3$-pyrrolinyl alkanes.

Example 2

6.9 parts (0.1 mol) of $\Delta^3$-pyrroline are dissolved in 30 parts of water together with 5.3 parts (0.05 mol) of sodium carbonate, and 8 parts (0.1 mol) of ethylene chlorohydrin are added. The reaction mixture is heated under reflux for 24 hours at 80 to 100° C. The resulting reaction mixture is extracted with ether, as indicated in Example 1, and upon distillation of the ether from the combined extracts, a concentrated aqueous residue is obtained containing principally 2-(N-Δ³-pyrrolinyl)-ethanol.

In similar manner, equivalent amounts of other alkylene halohydrins can be used instead of the ethylene chlorohydrin employed in the foregoing example. Such compounds include, for example, propylene chlorohydrin, butylene bromohydrin, isobutylene chlorohydrin, or glycerol α-chlorohydrin. These compounds can be reacted with Δ³-pyrroline in the manner described in the foregoing examples to form the corresponding N-Δ³-pyrrolinyl alkanols.

Example 3

6.9 parts (0.1 mol) of Δ³-pyrroline are reacted, as indicated in the preceding example, in solution in 30 parts of water, with 16.2 parts (0.1 mol) of barium chloroacetate and 15.8 parts (0.05 mol) of barium hydroxide $(Ba[OH]_2.8H_2O)$. The reaction is carried out by heating the mixture to boiling temperature under reflux for 24 hours. At the end of this period, the mixture is evaporated to dryness, and the dry residue extracted with hot absolute alcohol to separate the condensation product from the barium chloride produced in the reaction. The alcoholic extract is evaporated to dryness, taken up in water, and treated with sufficient dilute sulfuric acid to convert all of the barium contained therein to barium sulfate. After filtering, the filtrate is evaporated to dryness, and the residue recrystallized from alcohol. The product thus obtained is N-Δ³-pyrrolinyl acetic acid.

Instead of a salt of chloroacetic acid, other halo fatty acids or their salts can be used, as, for example, β-chloropropionic acid, γ-chlorobutyric acid, or the corresponding brom-substituted fatty acids. These compounds can be treated in the manner described in this example, to yield the corresponding N-Δ³-pyrrolinyl aliphatic carboxy acids.

Example 4

10 parts of 1,2-bis(N-Δ³-pyrrolinyl)-ethane, prepared according to Example 1, are dissolved in 100 parts of water, and sufficient 10% hydrochloric acid is added to provide a weak acid reaction. Ozone is passed into the resulting solution until a sample of the mixture no longer decolorizes a solution of bromine in glacial acetic acid. 30 parts of 30% hydrogen peroxide are added to the mixture, and after allowing it to stand for 12 hours, the product is filtered out and washed with water. The crystalline product thus obtained is ethylene bisiminodiacetic acid, which can be readily converted to its alkali metal or ammonium salts by neutralization with a calculated amount of the appropriate hydroxide or carbonate (e. g. NaOH, KOH or NH₄OH). The resulting alkali metal or ammonium salts are water-soluble, and are valuable textile assistants for preventing the precipitation of insoluble soaps from hard water.

Example 5

10 parts of the product of Example 1 are dissolved in 50 parts of water, and the solution is heated at 60 to 70° C. While maintaining this temperature, a saturated solution of potassium permanganate is slowly added until a slight excess of permanganate remains in the mixture. The insoluble manganese dioxide formed in the reaction is removed by filtration, and the filtrate is concentrated by evaporation to 100 parts by volume. The resulting solution is acidified with hydrochloric acid until acid to Congo Red, and allowed to cool, whereupon ethylene bisiminodiacetic acid crystallizes from the solution.

Example 6

10 parts of the product of Example 1 and 50 parts of potassium bichromate are added to 350 parts of 25% sulfuric acid, and the resulting mixture heated gradually to boiling over a period of 1 hour and maintained at boiling temperature for 2 to 3 hours. The solution is rendered alkaline with ammonia, filtered while hot from the precipitated chromium hydroxide, and the filtrate acidified to Congo Red with hydrochloric acid. On cooling, ethylene bisiminodiacetic acid separates from the solution and can be recovered therefrom in crystalline form.

Example 7

10 parts of the product of Example 1 are heated with 150 parts of concentrated nitric acid (specific gravity 1.4) and 0.1 part of vanadium pentoxide are added to catalyze oxidation. The mixture is maintained at 25 to 30° C. for 24 hours. At the end of this time, the mixture is rendered alkaline by addition of aqueous caustic soda, filtered, and the filtrate heated and acidified with sulfuric acid. On cooling the resulting solution, ethylene bisiminodiacetic acid separates in crystalline form from the solution.

Example 8

10 parts of 2-(N-Δ³-pyrrolinyl)-ethanol, obtained according to Example 2, are subjected to oxidation with potassium permanganate in the manner described in Example 5. The reaction product contained in the filtrate of the reaction mixture is an alkali metal salt of nitrilo triacetic acid, which can be isolated, by filtration from the MnO₂ and acidification of the resulting solution, whereupon the product crystallizes.

Nitrilo triacetic acid, particularly in the form of its water-soluble alkali metal or ammonium salts, is a valuable textile assistant similar in its applications to ethylene bisiminodiacetic acid, in that it likewise prevents the precipitation of water-insoluble soaps from hard water treatment baths.

Example 9

10 parts of N-Δ³-pyrrolinyl acetic acid, obtained according to Example 3, are oxidized with ozone and hydrogen peroxide in aqueous hydrochloric acid solution in the manner described in Example 4. The resulting product, which is nitrilo triacetic acid, can be recovered in the manner described in the preceding example.

The aliphatic halogen compounds employed in the condensation of the invention may contain chlorine, bromine or iodine as the replaceable halogen atom. Chlorine, however, is preferred for reasons of economy. As preferred classes of reagents, there may be mentioned dihalo alkanes of 2 to 6 carbon atoms, halogen substituted alkanols, particularly the halohydrins, and lower halo fatty acids, especially those containing the halogen atom in α-position. In each case, these compounds contain not more than one halogen atom attached to any one carbon atom, at least one of the remaining valences of such halogen-bearing carbon atoms being attached to another carbon atom, and the remaining valences being satisfied by hydrogen.

In carrying out condensation of the aforesaid halo aliphatic compounds with Δ³-pyrroline, other acid binding agents can be employed instead of sodium carbonate or barium hydroxide used in the foregoing examples, such as, for example, potassium, calcium, barium or magnesium carbonates, sodium, potassium, calcium, barium or magnesium hydroxides, or magnesium, calcium or barium oxides. The acid binding agents are added to the reaction mixture in sufficient amount to neutralize all of the hydrogen halide liberated in the condensation of $\Delta^3$-pyrroline with the aliphatic halide, and if any unneutralized acid groups are present in the reagents undergoing condensation, a sufficient excess is also added to neutralize these acid groups.

The amounts of $\Delta^3$-pyrroline and halogenated aliphatic compound subjected to condensation preferably correspond to the stoichiometrical amounts required for condensation. However, an excess of either reagent can be present.

The reaction medium employed for the condensation is generally water. However, the reaction can be facilitated in some cases, particularly when water-insoluble reagents such as the alkylene halides are employed, by inclusion in the reaction mixture of an inert mutual solvent (e. g. dioxane) or a small amount (e. g. 0.1%) of an inert emulsifying agent such as an alkyl benzene sulfonic acid or diisobutylphenoxyethoxy ethanol.

The reaction temperature employed in the condensation is generally from 70 to 100° C., the reaction being carried out at these temperatures in a reflux apparatus to avoid loss of volatile reagents or of the reaction medium.

In the conversion of the resulting aliphatic pyrroline derivatives to the corresponding iminodiacetic acid compounds, strong oxidizing agents are employed which are adapted to attack the olefinic double bond of the $\Delta^3$-pyrrolinyl radical. The mixtures employed in the examples illustrate such oxidizing agents. When an additional oxidizable radical, such as the ethanol group of the product of Example 2 is present, such radicals can also be oxidized, especially to carboxy acid radicals, concurrently with the oxidation of the $\Delta^3$-pyrrolinyl radicals. This procedure is illustrated in Example 8.

The polycarboxylic acids produced by oxidation of the aliphatic $\Delta^3$-pyrroline compounds are water-soluble in the form of their alkali metal ammonium salts, and as indicated above, are valuable assistants for use in the textile and related industries.

Variations and modifications which will be obvious to those skilled in the art can be made in the process of this invention without departing from the scope or spirit thereof.

I claim:

1. A process which comprises condensing $\Delta^3$-pyrroline at its —NH— group with an aliphatic halogen compound in which one valence of at least 1 carbon atom is attached to a replaceable halogen atom, at least one of the remaining valences of said carbon atom being joined to another carbon atom, and the other remaining valences being joined to hydrogen, said condensation being effected by heating the aforesaid reagents in aqueous medium in the presence of an acid binding agent.

2. A process as claimed in claim 1, wherein condensation is effected by heating the reaction mixture under reflux at 70 to 100° C.

3. A process which comprises condensing $\Delta^3$-pyrroline at its —NH— group with a dihaloalkane of 2 to 6 carbon atoms by heating the aforesaid compounds together in an aqueous reaction medium in the presence of an acid binding agent at a temperature of from 70 to 100° C.

4. A process which comprises condensing $\Delta^3$-pyrroline at its —NH— group with an alkylene halohydrin by heating these reagents in an aqueous medium in the presence of an acid binding agent at a temperature of from 70 to 100° C.

5. A process which comprises condensing $\Delta^3$-pyrroline at its —NH— group with a monohalo aliphatic carboxy acid by heating these reagents in an aqueous medium at 70 to 100° C. in the presence of an acid binding agent.

6. A process which comprises condensing 2 mols of $\Delta^3$-pyrroline at its —NH— group with 1 mol of ethylene dichloride by heating these reagents in an aqueous medium at 70 to 100° C. in the presence of an acid binding agent.

7. A process which comprises condensing 1 mol of $\Delta^3$-pyrroline at its —NH— group with 1 mol of ethylene chlorohydrin by heating these reagents in an aqueous medium at 70 to 100° C. in the presence of an acid binding agent.

8. A process which comprises condensing 1 mol of $\Delta^3$-pyrroline at its —NH— group with 1 mol of chloroacetic acid by heating the reagents in an aqueous medium at a temperature of 70 to 100° C. in the presence of an acid binding agent.

9. An N-aliphatic $\Delta^3$-pyrrolinyl compound, wherein the nitrogen atom of the $\Delta^3$-pyrroline radical is attached to a carbon atom of which at least one of the remaining valences is joined to carbon and the other remaining valences are joined to hydrogen.

10. 1,2-bis(N-$\Delta^3$-pyrrolinyl)-ethane.

11. N-$\Delta^3$-pyrrolinyl acetic acid.

12. 2-(N-$\Delta^3$-pyrrolinyl)-ethanol.

JOHN WILLIAM COPENHAVER.

REFERENCES CITED

The following references are of record in the file of this patent:

Chem. Abs., vol. 29, p. 4356[4], citing Treibs et al., Annalen, 517, pp. 170–172 (1935).